UNITED STATES PATENT OFFICE.

PERRY DAVIS, OF FALL RIVER, MASSACHUSETTS.

IMPROVEMENT IN THE MODE OF HARDENING STEEL.

Specification forming part of Letters Patent No. 2,209, dated August 4, 1841.

*To all whom it may concern:*

Be it known that I, PERRY DAVIS, of Fall River, in the county of Bristol and State of Massachusetts, have invented a new and useful Improvement in the Process of Hardening Steel, so that it can be hammered at a reduced temperature without breaking, which is described as follows:

In the ordinary mode of working cast-steel the metal is heated and worked on the anvil to the form required. It is then reheated and plunged into water, after which it is tempered, so as to reduce it to the proper hardness necessary to being heated to the color indicating the degree of hardness required, after which it is cooled by being plunged into oil or water. After the steel is hardened, and before tempering, it frequently happens that the instrument forged is found sprung or bent, when, owing to the brittleness of the metal hardened in this manner, it cannot be straightened without being broken. To obviate this difficulty the present process is intended, which consists in plunging the instrument of cast-steel, after being forged into shape, as in the old mode, and then reheated, into a composition of borax, oil, and charcoal, to harden it, instead of water, which mode of hardening gives an elasticity to the metal, with the same degree of hardness that was obtained by the old method, so that the metal, after being hardened in this way, can be straightened or bent without any danger of being broken. The steel, being hardened in this manner, may be tempered in the ordinary way to whatever degree of hardness is required.

The proportions of the composition may be as follows, variable at pleasure: two ounces of pulverized charcoal, one ounce of pulverized borax, and one quart of oil, (whale or other kind of oil,) to be mixed in any suitable vessel.

What I claim as my invention, and which I desire to secure by Letters Patent, is—

The mode of hardening steel so as to render it flexible by means of the composition of oil, charcoal, and borax, as set forth.

PERRY DAVIS.

Witnesses:
   CYRUS ALDIN,
   ISAAC W. PAGE.